Nov. 24, 1931.  W. T. ROSE  1,833,860
HAY RAKE
Filed June 24, 1930  3 Sheets-Sheet 1
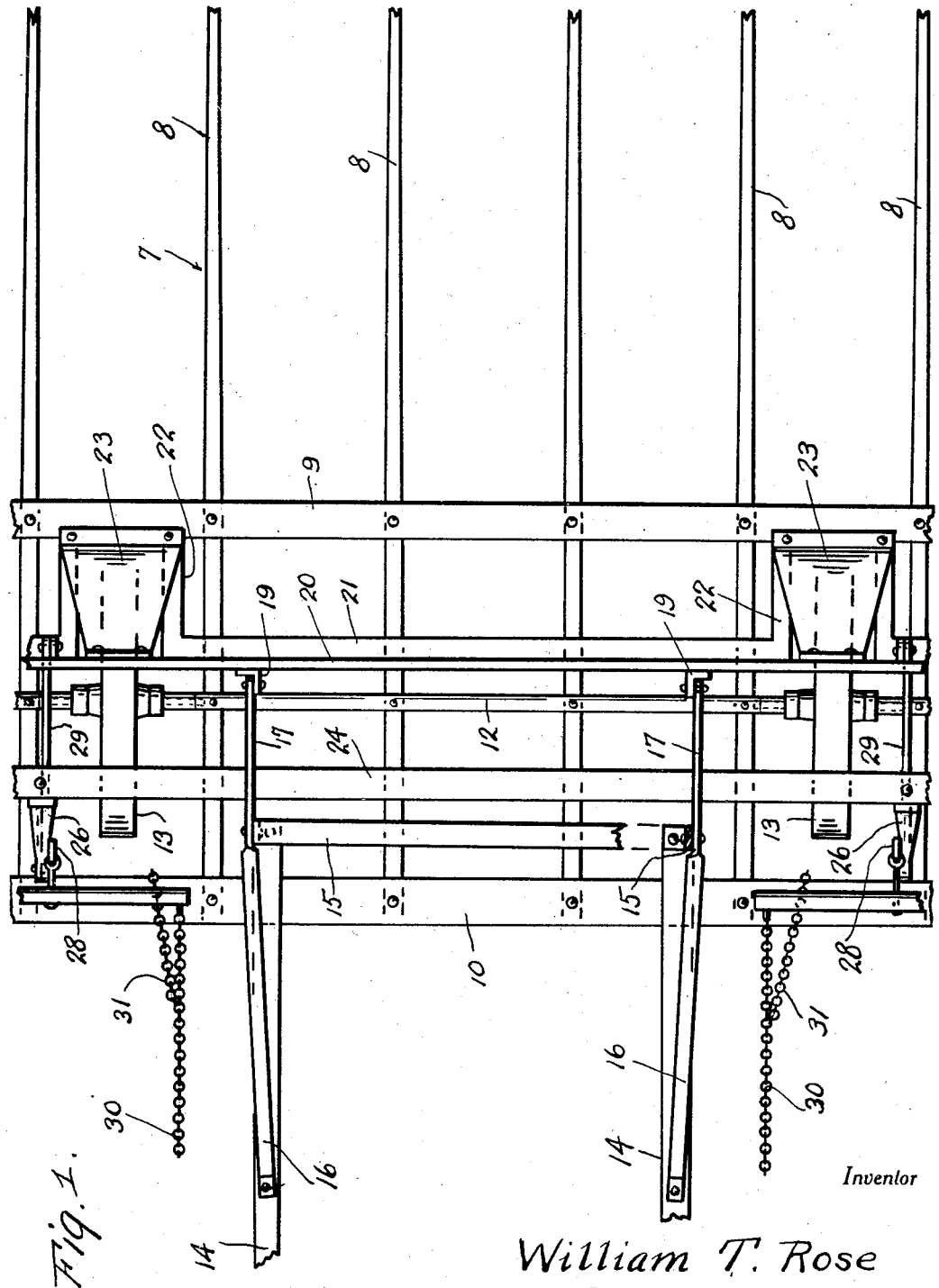
Inventor
William T. Rose
By *Clarence A. O'Brien*
Attorney Nov. 24, 1931.  W. T. ROSE  1,833,860
HAY RAKE
Filed June 24, 1930   3 Sheets-Sheet 2
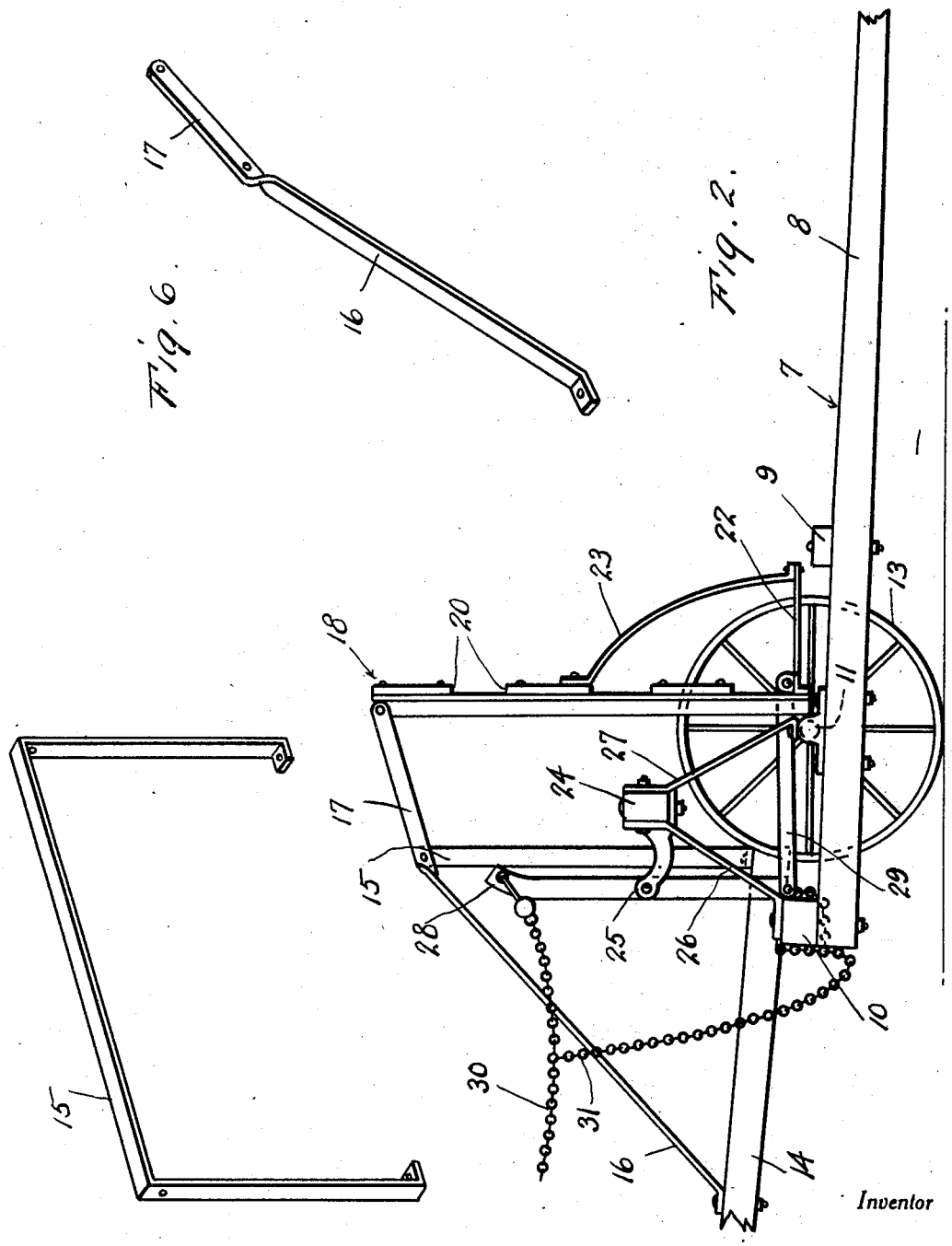
Inventor
William T. Rose
By Clarence A. O'Brien
Attorney

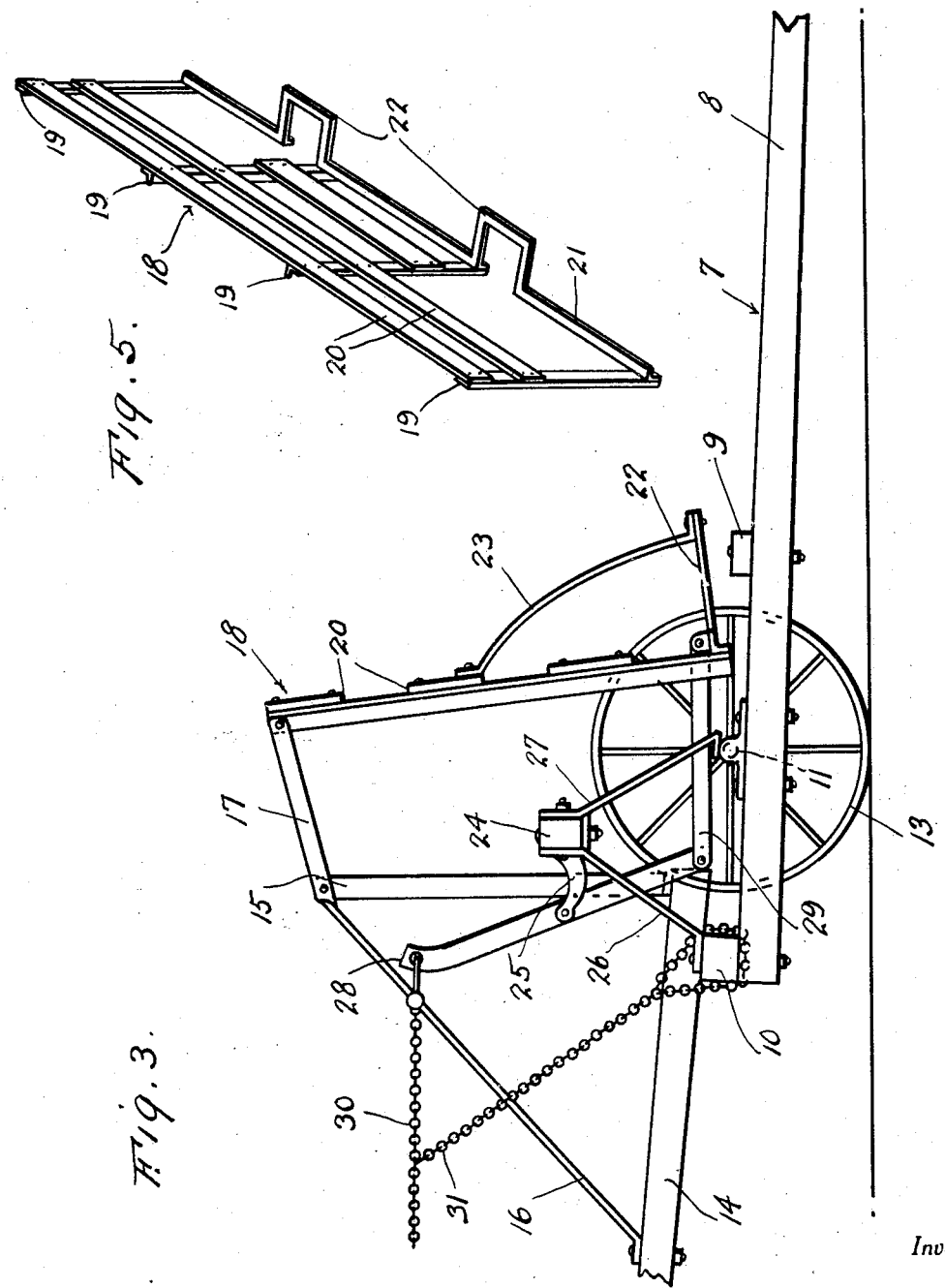

Patented Nov. 24, 1931

1,833,860

UNITED STATES PATENT OFFICE

WILLIAM T. ROSE, OF BALFE, NEBRASKA

HAY RAKE

Application filed June 24, 1930. Serial No. 463,483.

This invention relates to certain structural improvements and refinements embodied in a novel and feasible type of portable hay rake in the form of a low bodied wheeled truck including a huge rack-like platform disposed in close proximity to the ground for gathering hay and subsequently discharging or dumping it at desired points.

The improved structure is characterized by a finger equipped raking platform, at the inner end of which is a substantially vertical ejecting and follower frame, said frame being for the purpose of pushing off the load of hay at the desired point in the field and being so constructed and regulated as to permit it to be operated by one or more horses constituting the primary draft means for the complete machine.

The specific structural details and their physical association and arrangement will become more readily apparent from the following description and drawings.

In the drawings:

Figure 1 is a fragmentary top plan view of the complete structure showing the major details thereof as developed in accordance with the present invention.

Figure 2 is a side or end elevation with the ejecting frame in normal raking position.
Figure 3 is a view like Figure 2, with the frame projected for ejecting the load of hay from the rake.

Figure 4 is a perspective detail view of an arch constituting one of the parts of the structure.

Figure 5 is a perspective view of the follower or ejecting frame.

Figure 6 is a detail perspective view of a bracing strap.
In the drawings, the numeral 7 designates the substantially horizontally disposed forwardly and downwardly inclined rake. This embodies a plurality of spaced parallel fingers or bars 8 whose forward end portions are constructed to facilitate the pick-up and loading. There is a cross brace at 9 and a transverse headpiece at 10.

Near the headpiece is a suitable bearing 11 in which the axle 12 is journalled for rotation. On opposite ends of the axle are the ground engaging and propulsion wheels 13. The numerals 14 designate rearwardly extending beams or timbers which extend to a point for connection with a caster wheel truck having a seat for accommodating the driver (not shown).

Incidentally, the horses (a pair of them) stand on opposite sides of these beams and are appropriately hitched to the structure for propelling it over the ground. Fastened to the inner projecting end of the beams is a substantially vertical fixedly mounted arch 15. Attached to this arch are metal straps 16 which have their lower rearward ends secured to the intermediate portions of the beams 14 and have their forward twisted ends 17 extending forwardly beyond and overlying the wheeled portion of the platform.

These portions 17 constitute supporting arms for the follower frame, generally designated by the numeral 18. As seen in Figure 5, this frame is of open-work design and embodies vertical struts 19 connected to horizontal rails 20. The bottom angle bar 21 thereof is provided with U-shaped offset portions 22 which embrace the tread portions of the wheels to provide clearance.

In this connection it will be observed that the numeral 23 designates arcuate metal plates or shields which are connected at their lower ends with the parts 22 and at their upper ends with the body portion of the frame to prevent the material from backing into and interfering with the rotation of the wheels. These plates 23 function primarily as wheel fenders.

The vertical struts 19 are pivotally connected to the forward ends of the arms 17 permitting the same to swing rearwardly and forwardly as desired.

As seen in Figure 3, the numeral 24 designates a horizontal stringer provided with a pair of longitudinally spaced brackets 25. The attaching members 26 and 27 serve to secure this stringer 24 to the headpiece 10 and the axle 12 as shown. These details 24, 25, 26 and 27 constitute means for accommodating the independently operable levers 28.

The lever in each instance is pivotally mounted intermediate its ends on the brackets and has its lower end connected with pushrod 29 which extends forwardly and has operating connection with the ejecting frame 18.

The numeral 30 designates a pull chain connected to the upper end of the lever 28 and adapted to extend rearwardly for connection with the harness (not shown) of the draft animal. The numeral 31 in each instance merely designates the stop chain which limits the rearward pulling action of the chain 30.

In practice it is obvious that the horses are hitched to the structure rearwardly of the headpiece 10 of the main platform 7 and are also hitched to the beams 14. In this way the structure is pushed in advance of the animal to elevate and rake the loose hay on the platform 7 in an obvious manner. The hay backs up against the frame 18 when it is in the position seen in Figure 2.

When it is desired to push off the load of hay, this is accomplished by causing the horses to back slightly, thus exerting a pull on the chain 30. These chains manipulate the levers 28, pulling them rearwardly to the position seen in Figure 3 and forcing the pushrods 29 forwardly, thus swinging the outer swingable ends of the frame 18 forwardly.

This action shoves the load of material off of the platform. Incidentally, the platform is frequently referred to in the trade as the sweep. With the aid of this device, it is practical to propel the device along, to gather up the load of material, and to dump it by way of ejection and force through the medium of the frame at desired intervals, utilizing horse power for propulsion as well as horse power for manipulating the ejecting frame.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. A hay rake of the class described, comprising a wheel supported axle, a substantially horizontal material accommodating and gathering platform suspended from said axle, a hitching device fastened to and extending rearwardly from the rear end portion of the platform, a substantially vertically disposed swingably mounted frame suspended from the platform adjacent the rear end thereof, and animal actuated means for swinging said frame forwardly for ejecting the load of material from the platform.

2. A hay rake of the class described, comprising an axle, supporting wheels thereon, a substantially horizontal loading platform comprising spaced parallel bars secured together in assembled relation, said platform being suspended from the axle, draft and hitching means secured to the rear end portion of the platform rearwardly of the wheels, arms supported above the wheeled portion of the platform, a substantially vertically disposed ejecting frame hingedly connected to and depending from said arms into close proximity with the adjacent portion of the platform, links pivotally connected with the lower swingable ends of the frame, and operating levers supported from the platform and operatively connected with the links for swinging the frame forwardly to eject the load from the platform.

3. A hay rake of the class described, comprising an axle, supporting wheels thereon, a substantially horizontal loading platform comprising spaced parallel bars secured together in assembled relation, said platform being suspended from the axle, draft and hitching means secured to the rear end portion of the platform rearwardly of the wheels, arms supported above the wheeled portion of the platform, a substantially vertically disposed ejecting frame hingedly connected to and depending from said arms into close proximity with the adjacent portion of the platform, links pivotally connected with the lower swingable end of the frame, operating levers supported from the platform and operatively connected with the links, together with pull chains connected to the upper swingable ends of the levers and adapted for connection with the harness of the draft animal to permit the draft animal to supply the power for swinging the frame for ejecting the load of material from the platform.

4. A hay rake of the class described, comprising a wheel supported axle, a loading platform suspended therefrom, adjacent its rear end, hitching beams secured to the rear ends of the platform and projecting rearwardly therefrom to accommodate draft animals and the driver, brackets rigidly supported from the platform, levers pivoted intermediate their ends on said brackets, push rods connected to the lower ends of the levers, pull chains connected to the upper ends of the levers and adapted for operating connection with the harness of the adjacent animal, an arch supported above the platform, arms associated with the arch, and a substantially vertically disposed ejecting frame hingedly suspended from the forward end of the arms depending in a direction toward the platform, the aforesaid push rods being operatively connected with the lower swingable end portion of the frame for the purposes specified.

5. A hay rake comprising a wheel supported frame, substantially horizontal rake members supported by said frame and extended forwardly, an ejector frame extended across the rear parts of the rake members and having its upper end pivoted to a part of the frame, and means for swinging the lower part of the ejector frame forwardly to push the hay off the rake member.

6. A hay rake comprising a wheel supported frame, substantially horizontal rake members supported by said frame and extending forwardly, an ejector frame extending across the rear parts of the rake members and having its upper end pivoted to a part of the frame, means for swinging the lower part of the ejector frame forwardly to push the hay off the rake members, and means whereby the said means are operated by the draft animals.

In testimony whereof I affix my signature.

WILLIAM T. ROSE.